US012602663B2

(12) United States Patent
Clark et al.

(10) Patent No.: US 12,602,663 B2
(45) Date of Patent: Apr. 14, 2026

(54) ABSENCE FRAMEWORK

(71) Applicant: HARTFORD FIRE INSURANCE COMPANY, Hartford, CT (US)

(72) Inventors: Bridget S. Clark, Windham, ME (US); Chrystal Goodson, East Hampton, CT (US); Michael J Kelliher, Manchester, CT (US); Paul William Leach, Melbourne, FL (US); Dennis D. Pannella, Jr., Oxford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 18/896,117

(22) Filed: Sep. 25, 2024

(65) Prior Publication Data

US 2026/0087458 A1 Mar. 26, 2026

(51) Int. Cl.
| *G06Q 40/08* | (2012.01) |
| *G06Q 10/06* | (2023.01) |
| *G06Q 10/1057* | (2023.01) |
| *G06Q 50/26* | (2012.01) |

(52) U.S. Cl.
CPC ....... *G06Q 10/1057* (2013.01); *G06Q 50/265* (2013.01)

(58) Field of Classification Search
CPC .......................... G06Q 10/1057; G06Q 50/265
See application file for complete search history.

(56) References Cited

U.S. PATENT DOCUMENTS

| 7,184,962 | B2 | 2/2007 | Kalnas et al. |
| 8,639,634 | B2 | 1/2014 | Nelson et al. |
| 8,775,307 | B2 | 7/2014 | McLaughlin et al. |
| 11,093,902 | B2 | 8/2021 | Smith |
| 11,677,706 | B1 | 6/2023 | Chinnalagu et al. |
| 12,047,343 | B2 | 7/2024 | Chinnalagu et al. |
| 2006/0224478 | A1 | 10/2006 | Harbison et al. |
| 2008/0195512 | A1 | 8/2008 | Klebanoff et al. |
| 2012/0030128 | A1 | 2/2012 | Nelson et al. |
| 2013/0110736 | A1 | 5/2013 | Savage et al. |
| 2014/0114873 | A1 | 4/2014 | Contacos et al. |
| 2014/0114874 | A1 | 4/2014 | Nelson et al. |
| 2020/0342414 | A1 | 10/2020 | Smith |
| 2021/0133685 | A1* | 5/2021 | Gordon .................. G06Q 40/12 |

(Continued)

*Primary Examiner* — Maroun P Kanaan

(74) *Attorney, Agent, or Firm* — Buckley, Maschoff & Talwalkar LLC

(57) ABSTRACT

According to some embodiments, systems and methods are provided including a computer processor; and a computer memory, coupled to the computer processor, storing instructions that, when executed by the computer processor, cause the back-end application computer server to: receive an absence planning request from a first user; receive data for the first user from the data store and at least one of a first third-party platform and a second third-party platform; extract data from the received data for the first user; apply an absence planning algorithm to the extracted data to dynamically generate an absence plan; and output the generated absence plan; and a communication port coupled to the back-end application computer server to facilitate a transmission of data with remote user devices to support interactive user interface displays, including the absence plan, via a distributed communication network. Numerous other aspects are provided.

20 Claims, 15 Drawing Sheets

(56) References Cited

U.S. PATENT DOCUMENTS

| 2021/0374682 | A1 |   | 12/2021 | Smith |   |
|---|---|---|---|---|---|
| 2023/0379284 | A1 |   | 11/2023 | Chinnalagu et al. |   |
| 2024/0354709 | A1 | * | 10/2024 | Smith | .................. G06Q 40/125 |

* cited by examiner

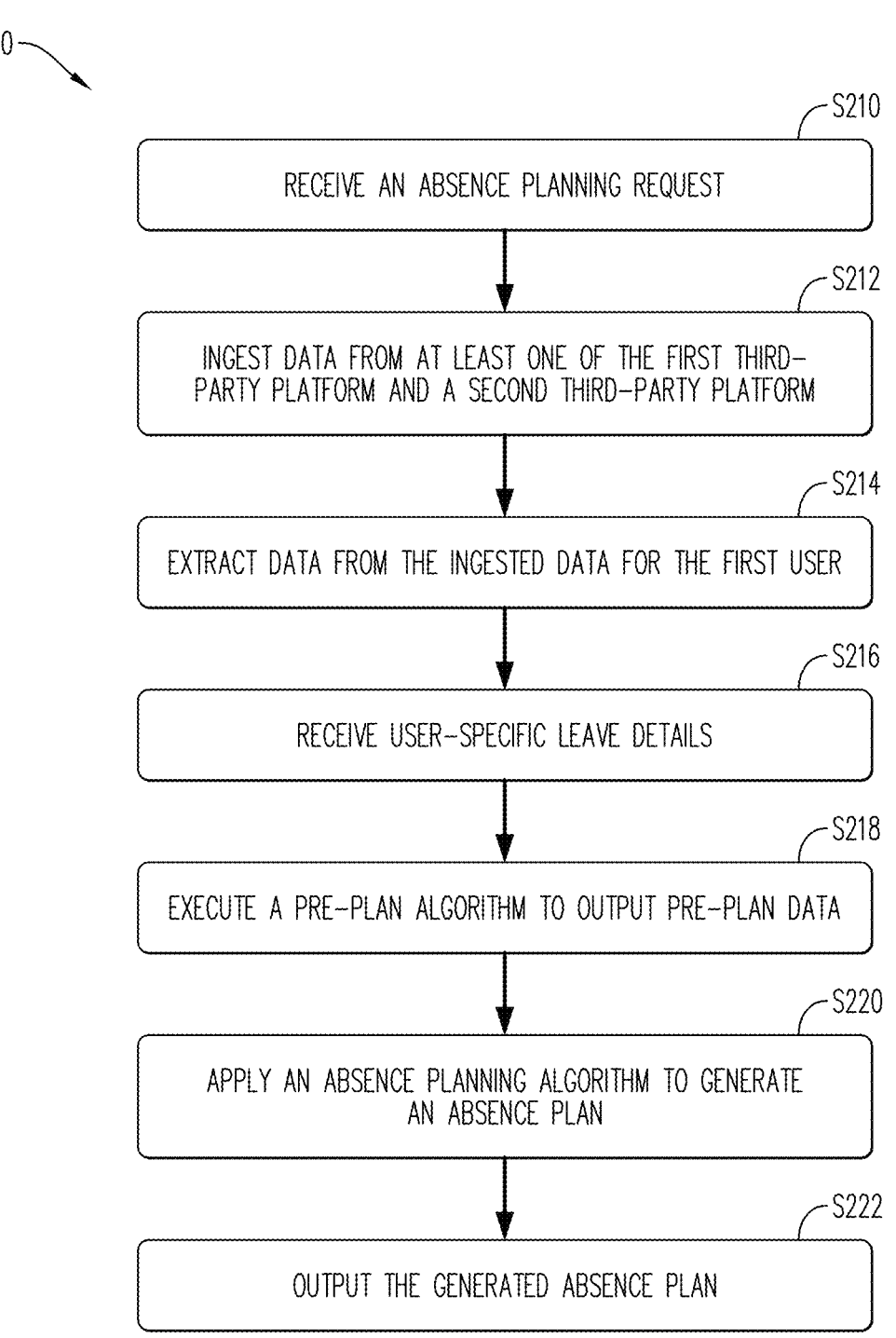

200

S210
RECEIVE AN ABSENCE PLANNING REQUEST

S212
INGEST DATA FROM AT LEAST ONE OF THE FIRST THIRD-PARTY PLATFORM AND A SECOND THIRD-PARTY PLATFORM

S214
EXTRACT DATA FROM THE INGESTED DATA FOR THE FIRST USER

S216
RECEIVE USER-SPECIFIC LEAVE DETAILS

S218
EXECUTE A PRE-PLAN ALGORITHM TO OUTPUT PRE-PLAN DATA

S220
APPLY AN ABSENCE PLANNING ALGORITHM TO GENERATE AN ABSENCE PLAN

S222
OUTPUT THE GENERATED ABSENCE PLAN

Leave Reason: Maternity Leave

Expected Due Date: February 28, 2025

Are you planning to have a C-Section?

Yes       No

702

Back     Next

704

800

1000

1100

1300

1400

ABSENCE FRAMEWORK

BACKGROUND

Employees of an enterprise may be absent from the enterprise for one of several reasons including, but not limited to, paid time off (PTO) (e.g., personal time off), vacation time, and a leave of absence (LOA). PTO is compensated time away from work, provided by the enterprise to its employees for the employees to use as they see fit. A LOA is an extended time away from work, which is unpaid. Often a LOA may be requested after the employee has exhausted their paid leave options (e.g., PTO and vacation time, etc.). The LOA is a way for employees who are experiencing out-of-the-ordinary circumstances to take time off work, while ensuring that they keep their job while away and avail themselves of other employment benefits such as health insurance coverage continuation for them and their family. Common reasons for LOA are childbirth, adoption, caring for an ill family member, serious health condition or military leave, etc. During the LOA, the absent individual remains an employee of the enterprise. Some of the reasons for a LOA are covered under federal and/or state laws, including, but not limited to Family and Medical Leave Act (FMLA), Emergency Family and Medical Leave Act (EFMLA), American with Disabilities Act (ADA) and ADA Amendments Act (ADAAA). The FMLA is a federal labor law that guarantees up to 12 weeks of unpaid leave during a period of 12 months for the following reasons: care for an ill family member, parental leave in case of childbirth, adoption or foster care, care for a covered service member with serious illness or injury, military exigencies, and jury duty. To be eligible for a LOA under the FMLA, certain criteria may be required. As a non-exhaustive example, the criteria may include: an enterprise is required to have employed 50 or more employees for at least 20 weeks within a radius of 75 miles from the enterprise office over the current or previous year; an employee who has been with the enterprise for the past 12 months and put in 1,250 hours of work is eligible to take a LOA. Other reasons for a LOA that are not covered under federal and/or state laws may be discretionary for the enterprise, and may be referred to as a Voluntary LOA. Some reasons for a Voluntary LOA include, but are not limited to, sabbatical, finishing higher education, moving houses, divorce, death or other family exigencies.

The multiple types of leaves available to an employee to protect their job and potentially replace their pay may be confusing, and the employee may not even be aware of the option of a LOA in the first place. Additionally, the different rules and requirements for LOA associated with the enterprise, federal government and state government (e.g., different states might have different requirements) may be complex and may overwhelm an employee. Manually tracking the options and regulations can be a complicated, time-consuming and error prone process, especially when third-parties (e.g., state and federal governments) are involved.

It would be desirable to provide improved systems and methods to accurately and/or automatically provide a LOA plan that is compliant with enterprise and governmental regulatory requirements. Moreover, the results should be easy to access, understand, interpret, update, etc.

SUMMARY OF THE INVENTION

According to some embodiments, systems, methods, apparatus, computer program code and means are provided to accurately and/or automatically provide a LOA plan in a way that provides fast and useful results.

Some embodiments are directed to system comprising: a data store that contains electronic records, each electronic record representing a user, and including, for each user, an electronic record identifier and a set of user attribute values; the back-end application computer server, coupled to the data store, including: a computer processor; and a computer memory, coupled to the computer processor, storing instructions that, when executed by the computer processor, cause the back-end application computer server to: receive an absence planning request from a first user; receive data for the first user from the data store and at least one of a first third-party platform and a second third-party platform; extract data from the received data for the first user; apply an absence planning algorithm to the extracted data to dynamically generate an absence plan; and output the generated absence plan.

Some embodiments comprise receiving an absence planning request from a first user; receiving, in response to the received absence planning request, data for the first user from a data store and at least one of a first third-party platform and a government platform; extracting data from the received data for the first user; dynamically generating an absence plan via application of an absence planning algorithm to the extracted data; and outputting the generated absence plan.

In some embodiments, a communication device associated with a back-end application computer server exchanges information with remote devices in connection with an interactive graphical user interface. This information may be exchanged, for example, via public and/or proprietary communication networks.

A technical effect of some embodiments of the invention is an improved and computerized way to accurately and/or automatically plan a LOA that ensures compliance with requirements. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 2 illustrates a method according to some embodiments of the present invention.

Figure 1:
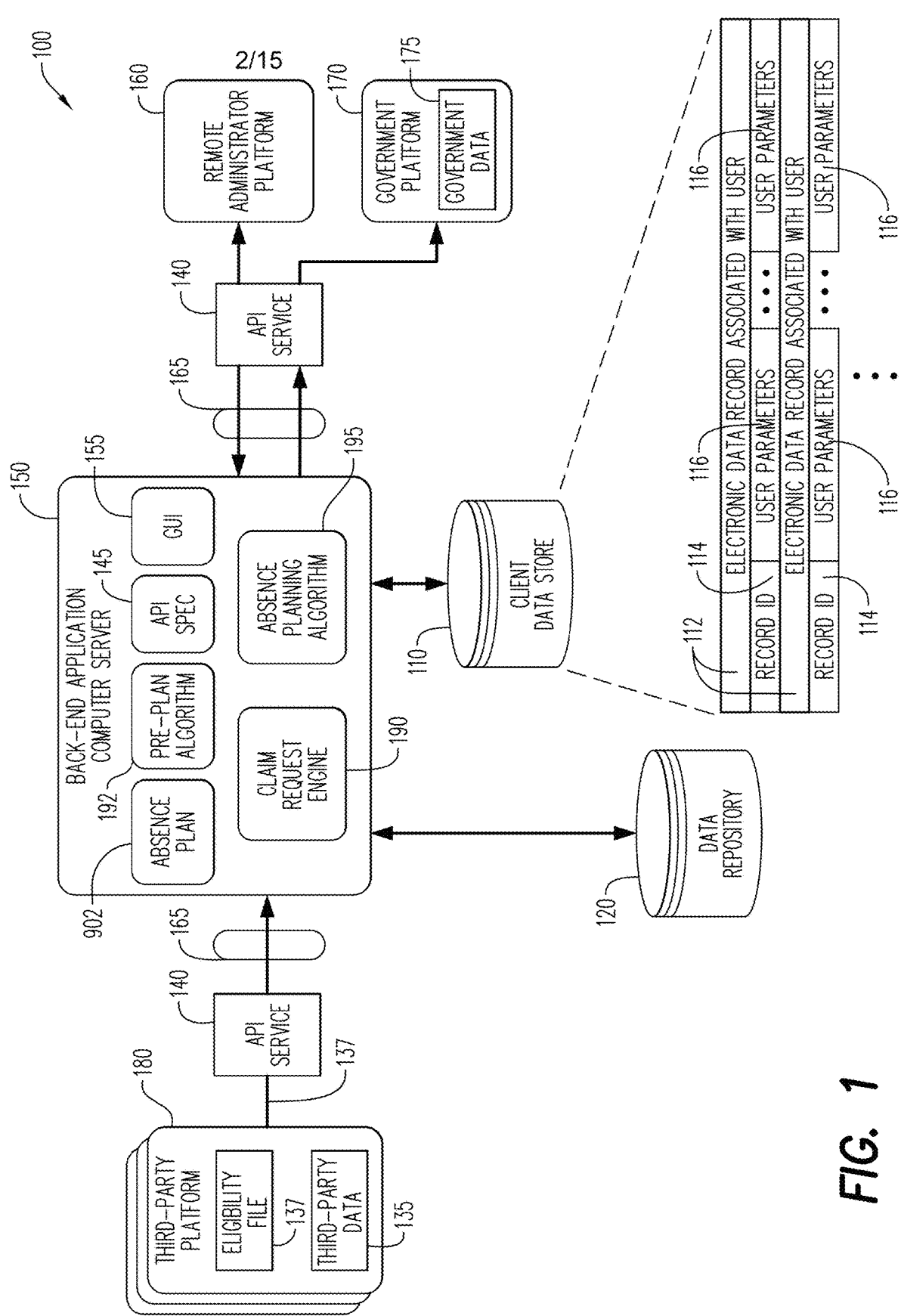
FIG. 1 is a high-level block diagram of a system architecture according to some embodiments of the present invention.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The present invention provides significant technical improvements to facilitate data efficiency and usefulness associated with an absence plan and claim generation framework. The present invention is directed to more than merely a computer implementation of a routine or conventional activity previously known in the industry as it provides a specific advancement in the area of electronic record analysis by providing improvements in the operation of a computer system that facilitates the generation of an absence plan and a claim request and retrieval of data from data stores. The present invention provides improvement beyond a mere generic computer implementation as it involves the novel ordered combination of system elements and processes to provide improvements in the speed and case of such data retrieval. Some embodiments of the present invention are directed to a system adapted to automatically generate at least one of a claim and an absence plan from a request using data retrieved from a data source via APIs. Embodiments may return a response to a user and/or submit the claim to the appropriate party. Some embodiments of the present invention are directed to aggregate data from multiple data sources, to automatically optimize equipment information to reduce unnecessary messages or communications, etc. Moreover, communication links and messages may be automatically established, aggregated, formatted, exchanged, etc. to improve network performance (e.g., by reducing an amount of used network messaging bandwidth and/or storage required to implement such data retrieval, support technological updates, etc.).

As described above, employees of an enterprise may be absent from the enterprise for one of several reasons including, but not limited to, paid time off (PTO) (e.g., personal time off), vacation time, and a leave of absence (LOA). Often employees are uneasy when they are absent as they are unsure about whether their leave will be job-protected, whether they will be paid during their leave, and what the next steps are to file a claim with an insurance company. An insurance claim ("claim") is a formal request by a policyholder to an insurance company for coverage or compensation for a covered loss or policy event. The insurance company validates the claim and, once approved, issues payment to the insured or an approved interested party on behalf of the insured. In the embodiments described herein, the claim is for compensation due to a LOA. Often, the employee does not know about the types of leave that are available to them before they start a claim, which conventionally leads to increased contact with the insurance company—via calls and electronic messages—to identify the type of leave their situation warrants. Additionally, applying for a LOA may include a lot of paperwork, bureaucracy and a lot of confusing questions. This process may also lead to increased bandwidth usage, as employees submit inaccurate claims, resulting in notification of the error, submission of a revised claim, etc. The inaccurate claims may be temporarily stored while the claim is getting sorted, increasing storage requirements. Further, the back-and-forth until the proper claim is submitted can be a time-consuming process that uses increased amounts of network messaging bandwidth.

Often, a client of the insurance company will routinely send demographic employee information to the insurance company to help determine employee eligibility for a LOA. The insurance company then has to store this data, knowing that less than one in ten employees will ever report a claim. Based on this demographic information, insurance companies conventionally provide generic leave information to the employees of their clients. For example, information about the existence of an enterprise plan or state or federal plan may be provided to the employee, without further employee-specific information. As a non-exhaustive example, conventionally an employee may be told they have federal leave, but not the details of what their employer plans offer. Further, when a claim is received, the insurance company needs to request additional information from the client to complete evaluation (e.g., including complex calculations) of the claim.

To address these problems, the absence planning framework provided by embodiments automatically and dynamically retrieves employee-specific data and LOA data from partner (third-party) platforms and generates an employee-specific absence plan. The employee-specific absence plan, as described below, is like a pre-claim in that the same data ingested to generate the absence plan is also required to submit a claim. The employee-specific absence plan may include one or more links for automatically submitting a claim to the appropriate party (e.g., insurance company, state agency, federal agency). In response to selection of the link, embodiments automatically generate a claim using the data in the absence plan and submit the claim to the appropriate party.

The absence planning framework provides for the optimization of absences where people need to plan for them (e.g., anything an employee can plan to be away from work for), so that the employee can understand how much leave they can take and how the leave will affect their job and finances. Non-exhaustive examples of planned absences are: planned parental leave, planned surgeries, planning to take care of family member (e.g., a parent). The absence planning framework may be used by anyone taking a leave of absence from work.

FIG. 1 is a high-level block diagram of an absence planning framework or system 100 according to some embodiments of the present invention. In particular, the system 100 includes a back-end application computer server 150 that may access information in client data store 110 (e.g., storing a set of electronic records associated with a set of users 112 (e.g., employees of the client), each record including, for example, one or more record identifiers 114, a set of user parameters 116 such as name, date of birth, geographic location, etc. and associated values). The back-end application computer server 150 may also exchange information with other data stores (e.g., a data repository 120 storing a set of electronic records associated with enterprise LOA parameters and/or location LOA parameters, including, for example, state LOA parameters, federal LOA parameters, etc.) and utilize a Graphical User Interface ("GUI") 155 to view, analyze, and/or update the electronic records. The back-end application computer server 150 may also exchange information with a remote administrator platform 160, a government platform 170, and one or more a third-party platform 180 (e.g., via a firewall 165). In some embodiments, the remote administrator platform 160 may transmit annotated and/or updated information to the back-end application computer server 150. Based on the updated information, the back-end application computer server 150 may adjust data in the client data store 110, the data repository 120, and/or the change may be viewable via other remote administrator platforms. The government platform 170 may be a specific $3^{rd}$ party platform and may transmit information to the back-end application computer server 150. Based on the received government information, the back-end application computer server 150 may determine the absence plan. As a non-exhaustive example, the government platform 170 may be associated with the State of Connecticut and may transmit calculations used to determine the benefits for the user (e.g., the calculation includes 80% of Values A, B, C plus 50% of Values D and E plus 10% of Value F). The back-end application computer server 150 may also transmit a completed claim request to the government platform 170 on behalf of the user at the user's request, initiating the government process. The third-party platform 180 may transmit information to the back-end application computer server 150. Based on the received third-party information, the back-end application computer server 150 may determine the absence plan. As a non-exhaustive example, the third-party platform 180 may be associated with a payroll vendor that provides employee-specific income information to the back-end application computer server 150 for determining the portion of the salary that is to be paid to the employee as part of the absence plan. Note that the back-end application computer server 150 and/or any of the other devices and methods described herein might be associated with a third party, such as a vendor that performs a service for an enterprise.

The back-end application computer server 150 may exchange data with the government platform 170 and the third-party platforms 180 via implementation of an Application Programming Interface (API) which provides external applications with access to stored data. The API specification 145 describes function calls provided by the API, including their parameters, example parameter values, and example usages. API specification 145 includes information of one or more APIs, each of which may be associated with one or more endpoints (i.e., URLs) and one or more methods (e.g., GET, POST, etc.). For each HTTP method corresponding to a URL, API specification 145 may include a description, parameters, and authentication method. During execution of the information exchange with the government platform and/or the third-party device, the back-end application computer server 150 sends the API call (e.g., a URL, a method and parameters) to the API service 140, which is associated with the URL of the call. API service 140 may comprise an OData service of the system, but embodiments are not limited thereto. API service 140 performs the task requested by the call on third-party data 135 of a third-party data store associated with the third-party platform 180 or on government data 175 of the government platform 170 and returns a response to the back-end application computer server 150.

The back-end application computer server 150 and/or the other elements of the system 100 might be, for example, associated with a Personal Computer ("PC"), laptop computer, tablet, smartphone, an enterprise server, a server farm, and/or a database or similar storage devices. According to some embodiments, an "automated" back-end application computer server 150 (and/or other elements of the system 100) may facilitate the automated access and/or update of electronic records. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the client data store 110 and the data repository 120. The client data store 110 and data repository 120 may be locally stored or reside remote from the back-end application computer server 150. As will be described further below, the client data store 110 may be used by the back-end application computer server 150 in connection with the absence planning tool to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and client data store 110 might be co-located and/or may comprise a single apparatus and/or be implemented via a cloud-based computing environment.

Note that the system 100 of FIG. 1 is provided only as an example, and embodiments may be associated with additional elements or components. According to some embodiments, the elements of the system 100 automatically transmit information associated with an interactive user interface display over a distributed communication network.

FIG. 2 illustrates a process 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

FIG. 2 comprises a flow diagram of a process 200 to generate an absence plan by executing the back end application computer server according to some embodiments. Process 200 and other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any one or more processing units, including but not limited to a processor, a processor core, and a processor thread. Embodiments are not limited to the examples described below.

Pursuant to embodiments, and as described above, the enterprise provides the back-end application computer server that generates the absence plan. The absence plan is provided for a user, who is an employee of a client (e.g., a third-party organization) of the enterprise. As a non-exhaustive example used throughout the specification, the enterprise is an insurance company, the client is a policy holder (e.g., another organization that has purchased the insurance policy on behalf of its employees), and the employees are employees of the client and are the "insured" individuals who benefit from the policy.

Prior to the process 200, the user logs into an Absence Planning Tool (not shown) provided by the enterprise. The user may be authenticated by suitable authentication processes. The Absence Planning Tool provides a secure login and logout functionality to ensure user privacy and data security. Pursuant to some embodiments, the Absence Planning Tool may be accessible to the user via their log-in with a Benefits platform without an additional sign on, such that the single sign-on process provides streamlined access for users. The use of the Absence Planning Tool and the data provided thereto by the user may be private and not shared with the client until the employee files a claim, allowing users control of when to share their plans with the client.

At S210 an absence planning request 1402 (FIG. 14) is received from a user. Prior to submission of the absence planning request 1402, the user accessed an absence planning display 300 via a Graphical User Interface ("GUI") 155, as shown in the non-exhaustive example of FIG. 3. The absence planning display 300 includes graphical representations of elements according to some embodiments. Selection of a portion or element of the display 300, and other GUI displays described herein, via a touchscreen or pointer may result in the presentation of additional information about that portion or element (e.g., a popup window presenting an explanation of the element; a popup window presenting additional information about the user; taking the user to another screen, etc.). The absence plan design and user eligibility determination is based on user selection of a "Begin a New Claim" element 302 and a "Plan My Leave" element 304 included in the non-exhaustive example of the absence planning display 300.

Selection of the "Begin a New Claim" element 302 may provide for the set-up of a new claim on behalf of the user.

Selection of the "Plan My Leave" element 304 may provide for the creation of an absence plan on behalf of the user.

The inventors note that having the ability to begin a new claim and create an absence plan from the same display, and the integration of programs pursuant to embodiments is advantageous as a number of user data parameters are the same for both starting a new claim and creating an absence plan, making creation of the absence plan and claims more efficient. For example, in a case the user wants to create an absence plan (e.g., to get an idea about what their leave will look like), after creation of the absence plan, the user may seamlessly report the claim. Pursuant to embodiments, and described further below, the back-end application computer server 150 retrieves user data for creating the absence plan and uses the data to create a claim request, and, in some instances, submit the claim request to the appropriate party (e.g., the enterprise, state agency, federal agency, etc.). In some embodiments, for creation of the absence plan, the back-end application computer server 150 connects, via an API, to a benefits engine conventionally used to pay a claim to retrieve information for the absence plan, like how much the employee gets paid.

Then, in S212, data (third-party data 135) from at least one of a first third-party platform and a second third-party platform is ingested by the back-end application computer server 150.

Pursuant to some embodiments, the ingested data may be data about the user submitting the absence planning request. The data may be ingested in response to selection of the "Begin a New Claim" element 302 or selection of the "Plan my leave" element 304.

In some embodiments, prior to the process 200, an eligibility file 137 is generated by the third-party based on third-party data 135 and is transmitted to the back-end application computer server 150. The eligibility file 137 includes, but is not limited to, employee name and employee work state. The employee data included in the eligibility file 137 is data for all of those employees eligible to receive services from the enterprise. In embodiments using the eligibility file 137, the data that is then ingested in S212 may be additional data and is specific for the user submitting the absence planning request. The eligibility file 137 may be received at scheduled intervals (e.g., daily, weekly, etc.) or in response to an event (e.g., a new employee is added and/or is eligible) in a push operation (e.g., initiated by the third-party device). Pursuant to some embodiments, the eligibility file 137 may be received in response to a pull operation, whereby the back-end computer server 150 sends a request for the eligibility file to the third-party platform.

In other embodiments, the eligibility file 137 is not used, and the data included in embodiments using the eligibility file is instead directly pulled from the third-party platform via the API service 140 as part of the data ingested in S212. Directly pulling the data from the third-party platform instead of using the eligibility file may result in the use of more real-time and accurate data. Additionally, not having to transfer messages about the eligibility file (e.g., each day, week, event, etc.) and/or store the eligibility file may result in reduced bandwidth usage, thereby improving network performance.

It is noted that the type of data ingested in S212 is largely agnostic with respect to whether the "Begin a New Claim" element 302 or the "Plan my leave" element 304 is selected. Of further note, the ingested data for starting a new claim may be largely the same as the ingested data for planning a leave. In some instances, and as described further below, as a result of that overlap in data, the generation of the absence plan may act like a pre-claim, as the information required to submit a claim is also used to generate the absence plan. The third-party platform may be the platform for the client itself, may be a partner platform to the client (e.g., a time management partner (e.g., Workday®), a payroll partner (e.g., ADP), a government platform providing state and/or federal regulation information, or other suitable platform. The back-end application computer server 150 is configured to receive and ingest data furnished by the third party platform via the API service 140. In particular, the system 100 and its component parts are configured to integrate with and import/ingest documents and data electronically and/or directly from the third-party platforms through an appropriately configured API, as described above.

The ingested data may include, but is not limited to, employee name, employee work state, hours, position, length of service, available LOA plans. In a case the ingested data is received from the government platform, the data may include federal and/or state-specific criteria and regulations regarding a LOA. The ingested data from the government platform may also include rules, policies, procedures and the like, federal laws, state laws, statutes, and directives from these government platforms, as well as a set of rules for evaluating a claim. It is noted there may be a wide variety of government agencies with no uniform or systematic manner by which a claim can be submitted, such that each agency may require different methods and information for assessing the claim. This disparity results in increased difficulty, confusion and inefficiency in claim submission. To address this disparity, embodiments provide for ingesting the appropriate data directly from the government platforms via the API service 140, such that the back-end application computer server 150 uses up-to-date and accurate data in generating the absence plan (and claim request, as described further below).

Figure 3:
FIG. 3 is a welcome display according to some embodiments of the present invention.
Figure 4:
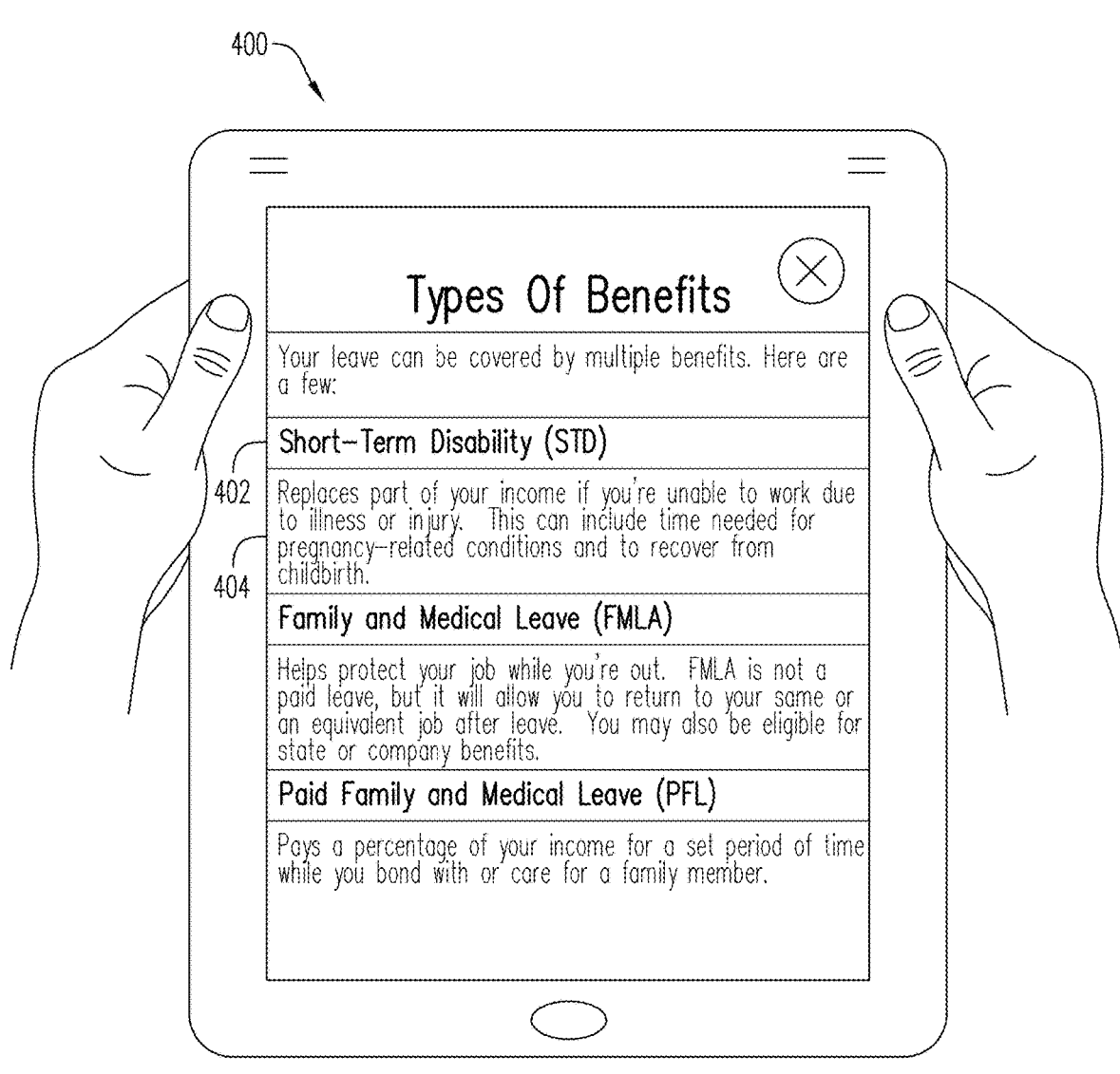
FIG. 4 is a benefit type display according to some embodiments of the present invention.

In a case the "Plan My Leave" element 304 is selected in FIG. 3, the Types of Benefits display 400 (FIG. 4) is presented via the GUI 155. The Types of Benefits display 400 may include the available leave/benefit programs 402 (e.g., Short-Term Disability (STD), Family and Medical Leave (FMLA), Paid Family and Medical Leave (PFL), Client Organization (Voluntary) Leave), etc.) to cover the user during their leave, and an explanation 404 of each benefit program. Pursuant to some embodiments, the available benefit programs 402 may be based on the client or other suitable criteria.

Figure 5:
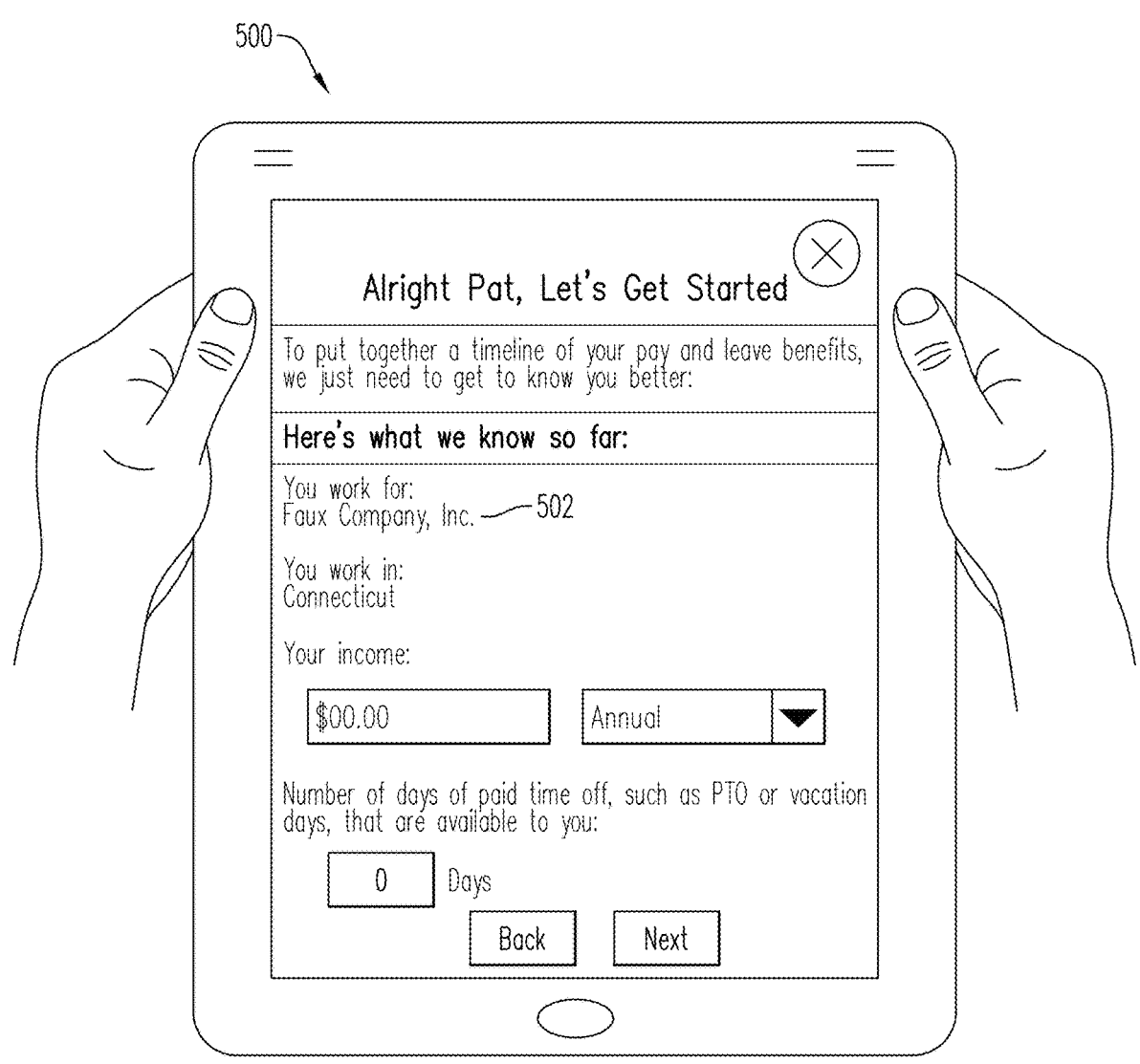
FIG. 5 is an absence planning display according to some embodiments of the present invention.

Then, in S214 data is extracted from the ingested data for the user. The extracted data may include, but is not limited to, the client name, the state the user works in, the income, the number of paid time off (PTO) days, etc. The extracted data 502 may be populated in the display 500 (FIG. 5) presented via the GUI 155. In some embodiments, in addition to the extracted data being populated in the display 500, one or more of the values may be changed by the user. As a non-exhaustive example, while the actual salary is extracted as the income value, the user may want to change the value because they know they're about to have a pay adjustment, and they want to see the impact of that pay adjustment. As another non-exhaustive example, the user may want to change the PTO value because they know about PTO days that they already have planned, or may want to plan, and they want to see the impact of that change to the absence plan. This is advantageous as embodiments customize the absence plan for the user. The customized absence plan is generated based on calculations using the employee's personal available plan benefits and data (e.g., salary, PTO, etc.) instead of generic versions of the plans and general data. With respect to the personal available plans, in some instances a user may be in a very specific plan (e.g., they are an executive and as a result they get a different level of benefit). As another non-exhaustive example, personal PTO day balances are used in the generation of the absence plan, resulting in the absence plan including actual available time and benefits for the user. The customized absence plan provides an absence plan that is individually meaningful to the user, rather than a collective employee of the client.

Figure 6:
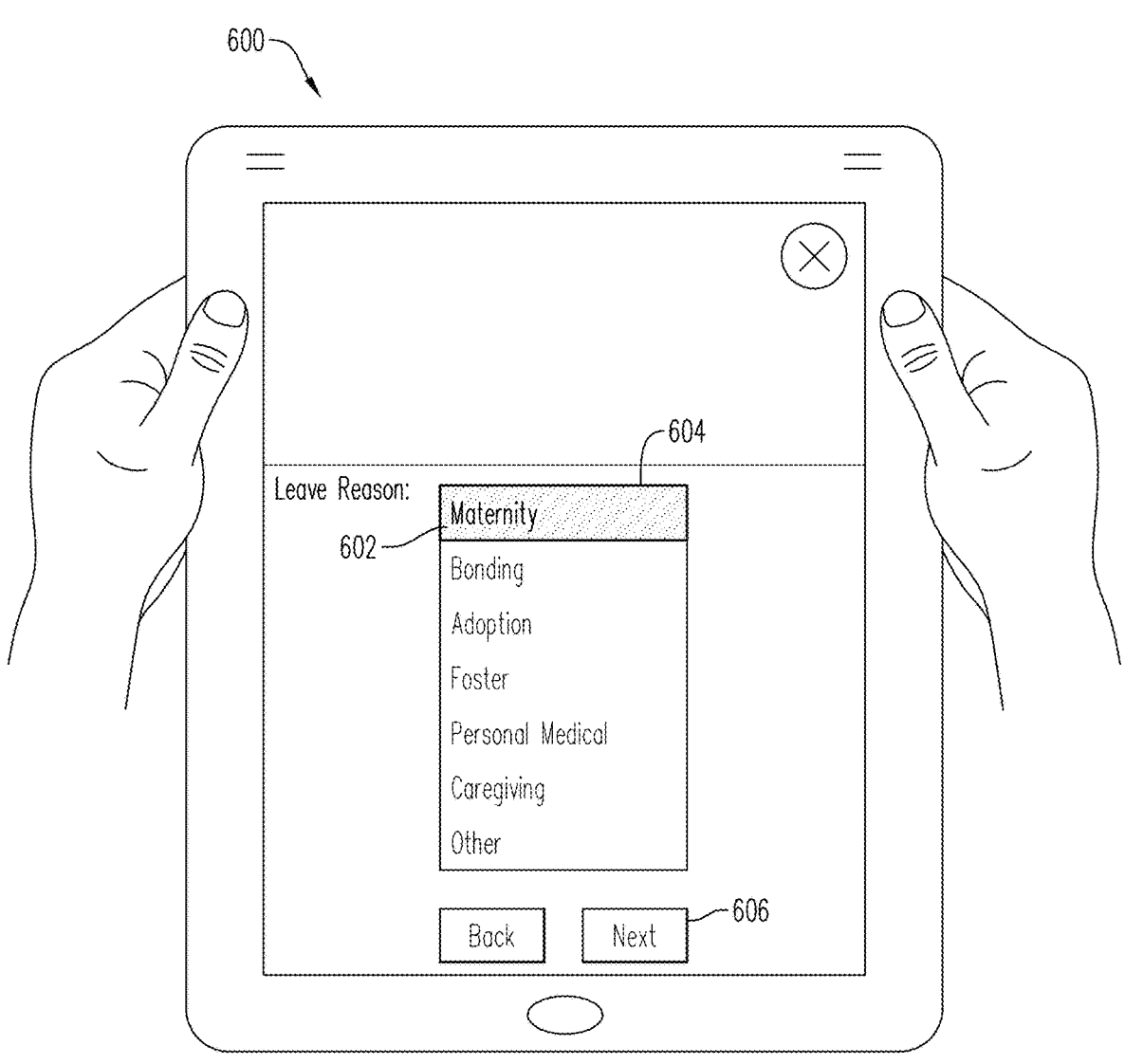
FIG. 6 is another absence planning display according to some embodiments of the present invention.
Figure 7:
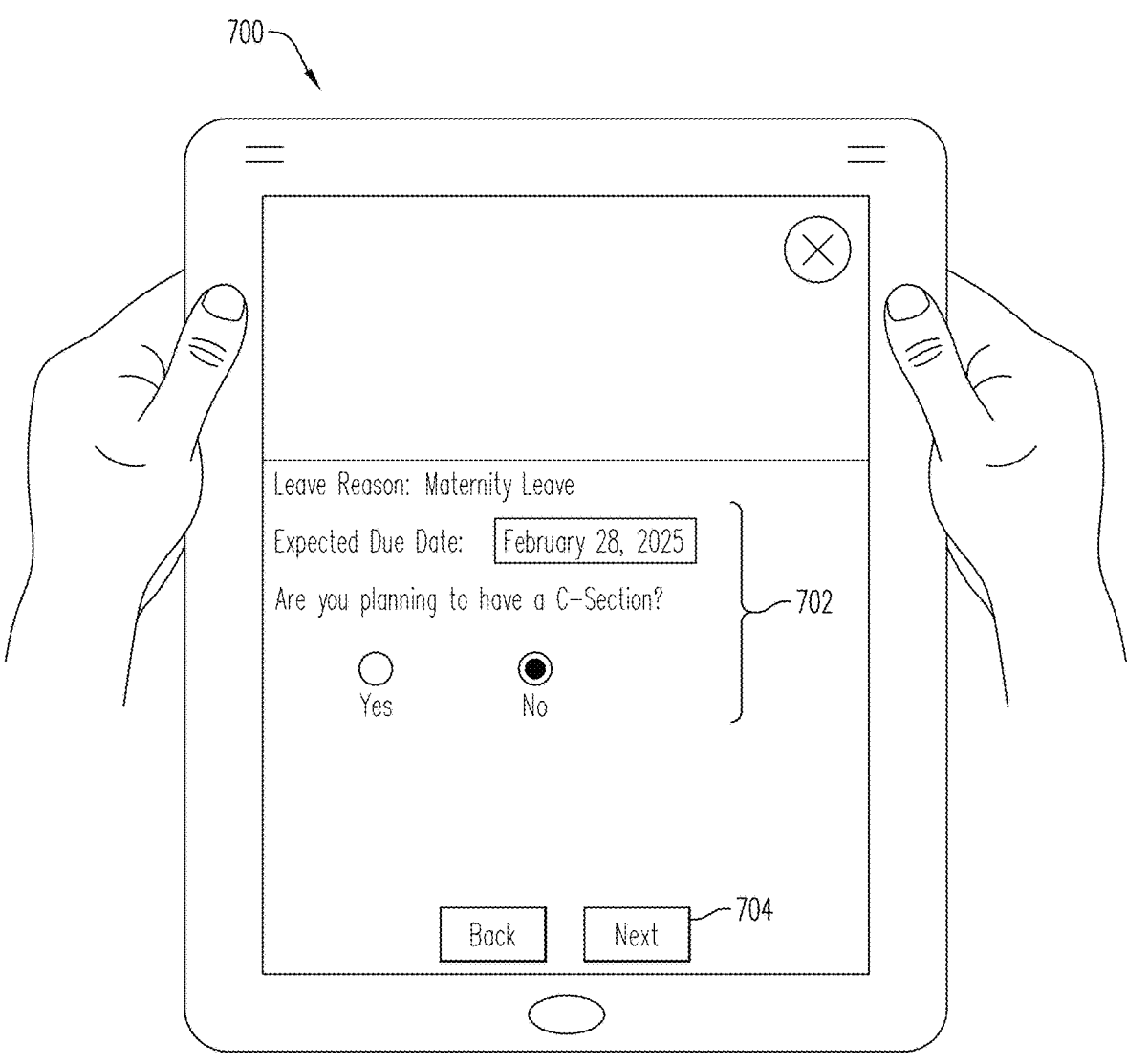
FIG. 7 is an absence planning question display according to some embodiments of the present invention.

The user may then be presented with a display 600 (FIG. 6) to input information about their planned leave, and the user-specific leave detail input is received in S216. Here, as a non-exhaustive example, the reason for the leave (leave type) is a maternity leave, and the user has selected "Maternity" as the reason for the leave element 602 from the drop-down menu element 604, indicated by the shading. It is noted that while a drop-down menu is shown herein, the reason for the leave may be selected via any other suitable process (e.g., selection of a radio button, text entry, etc.). In some embodiments, the reason for the leave may be selected by clicking a pointer over the desired reason for the leave element 602, which then automatically takes the user to the display 700 in FIG. 7, while in other embodiments, after the reason for the leave is selected, the user selects the "Next" element 606 to take the user to the display 700 in FIG. 7. Based on the selected reason for the leave, leave-reason specific questions 702 may be presented, as shown in FIG. 7. In this case, the leave-reason specific questions 702 include a question about due date and a question about whether a C-Section is planned. Other suitable questions may be presented. After answers to the questions are completed, the user selects the "Next" element 704.

Based on the answers to the questions, the back-end application computer server 150 may execute a pre-plan algorithm 192 to output pre-plan data in S218. The pre-plan data may be used in the generation of the absence plan, as described further below. Continuing with the non-exhaustive maternity example, the pre-plan data may include determining a first day absent date to be equal to the expected due date, and determining a bonding leave start date based on the first day absent date. As used herein, the term "algorithm" may refer to, for example, a process or set of rules to be followed in calculations or other problem-solving operations (e.g., by a computer) and/or any coding, software, networking, APIs, predictive models, predictive model metadata, predictive model hyper-parameters, other system components, etc.

Figure 8:
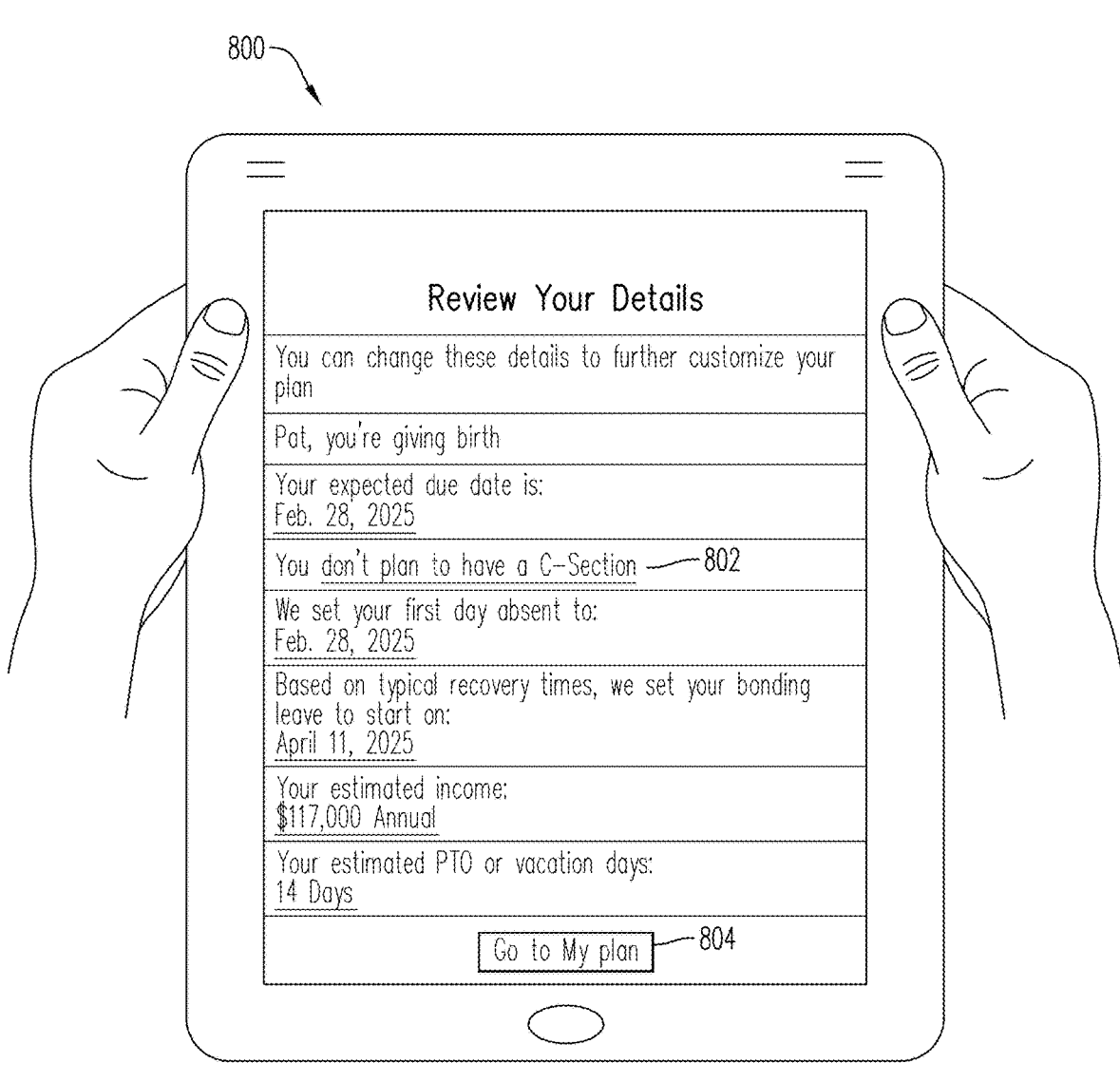
FIG. 8 is an absence planning summary display according to some embodiments of the present invention.

Next, the user may be presented, via the GUI 155, with a "Review Your Details" display 800, as shown in FIG. 8. The "Review Your Details" display 800 is a summary of the extracted data and the data the user has provided (e.g., changes made to the extracted data and user-specific leave detail input), as well as the output pre-plan data. The "Review Your Details" display 800 may include links 802, indicated here by underscores, for each of the data elements that may be customized/changed by the user. For example, the user may select the "don't plan to have a C-Section" link 802, which will return the user to the leave-reason specific questions 702 in the display 700 of FIG. 7. As another example, the first day absent date output by the pre-plan algorithm may not be the same day as the due date (e.g., the date may be before the due date). The user may change the data elements to see how the changes will affect the absence plan. The user may be able to save and download their progress on a leave plan and resume at a later time. In some embodiments, users may be able to save multiple versions with different scenarios (e.g., different first day absent dates, etc.).

Figure 9:
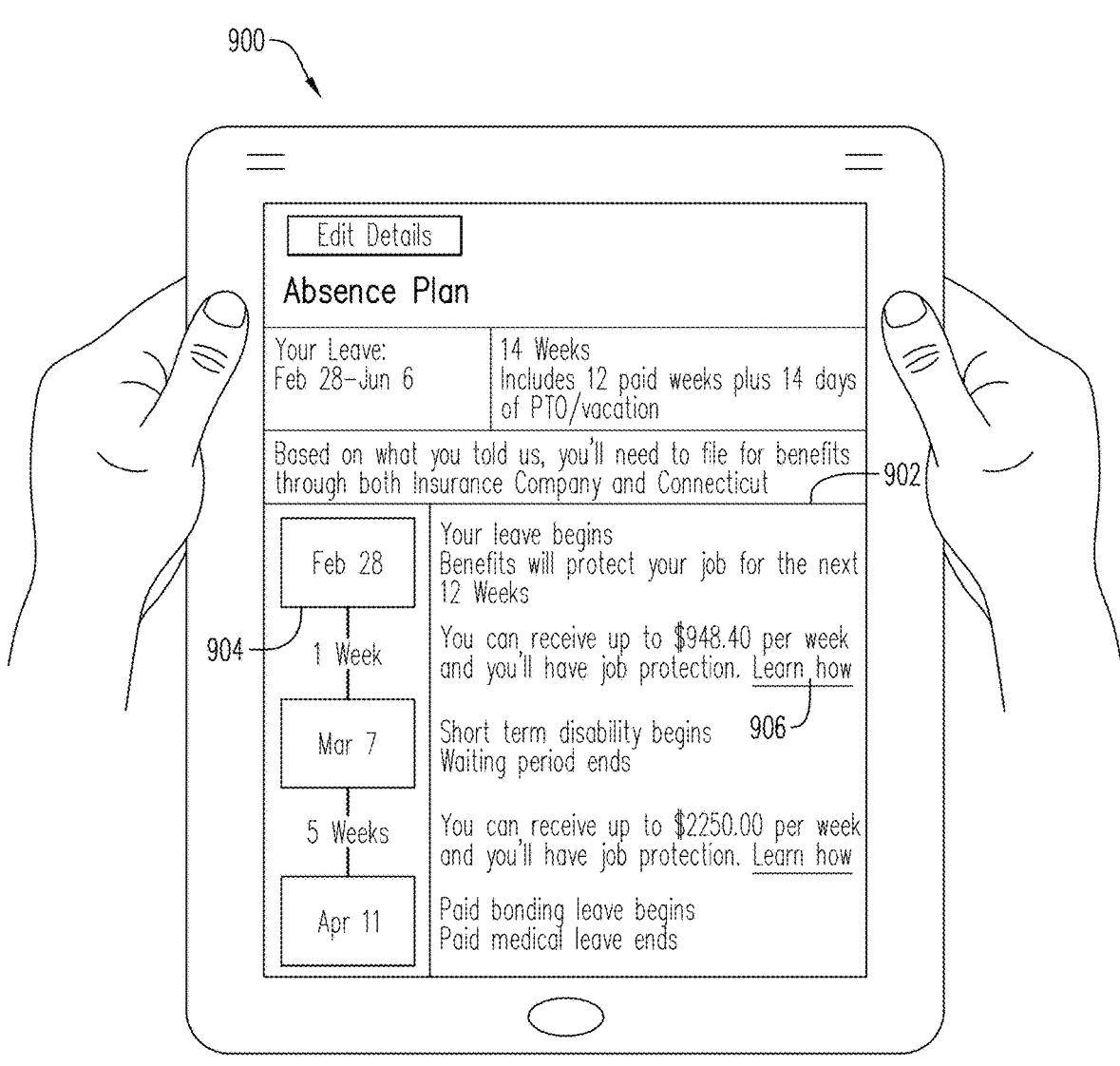
FIG. 9 is an absence plan display according to some embodiments of the present invention.

Then in S220, an absence planning algorithm 195 is applied to the data included in the "Review Your Details" display (e.g., extracted data, user-provided data, output pre-plan data and any changes thereto), as well as other ingested data (e.g., data provided by government platforms) to dynamically generate an absence plan 902. The absence plan 902 is output in S222, as shown in the display 900 of FIG. 9.

The absence planning algorithm 195 may be applied in response to selection of the "Go to My Plan" element 804 in FIG. 8. One or more rules applied by absence planning algorithm 195 may generate the absence plan and also ensure the required data to create the absence plan is complete. As an example, this may include running one or more queries to ensure the data is complete, such as a query to determine the presence of necessary information (e.g., leave start date), a query to determine that all of the fields have been completed/filled out, etc. If data is missing, the necessary data may be retrieved and input, or requested for manual input by the user.

Figure 10:
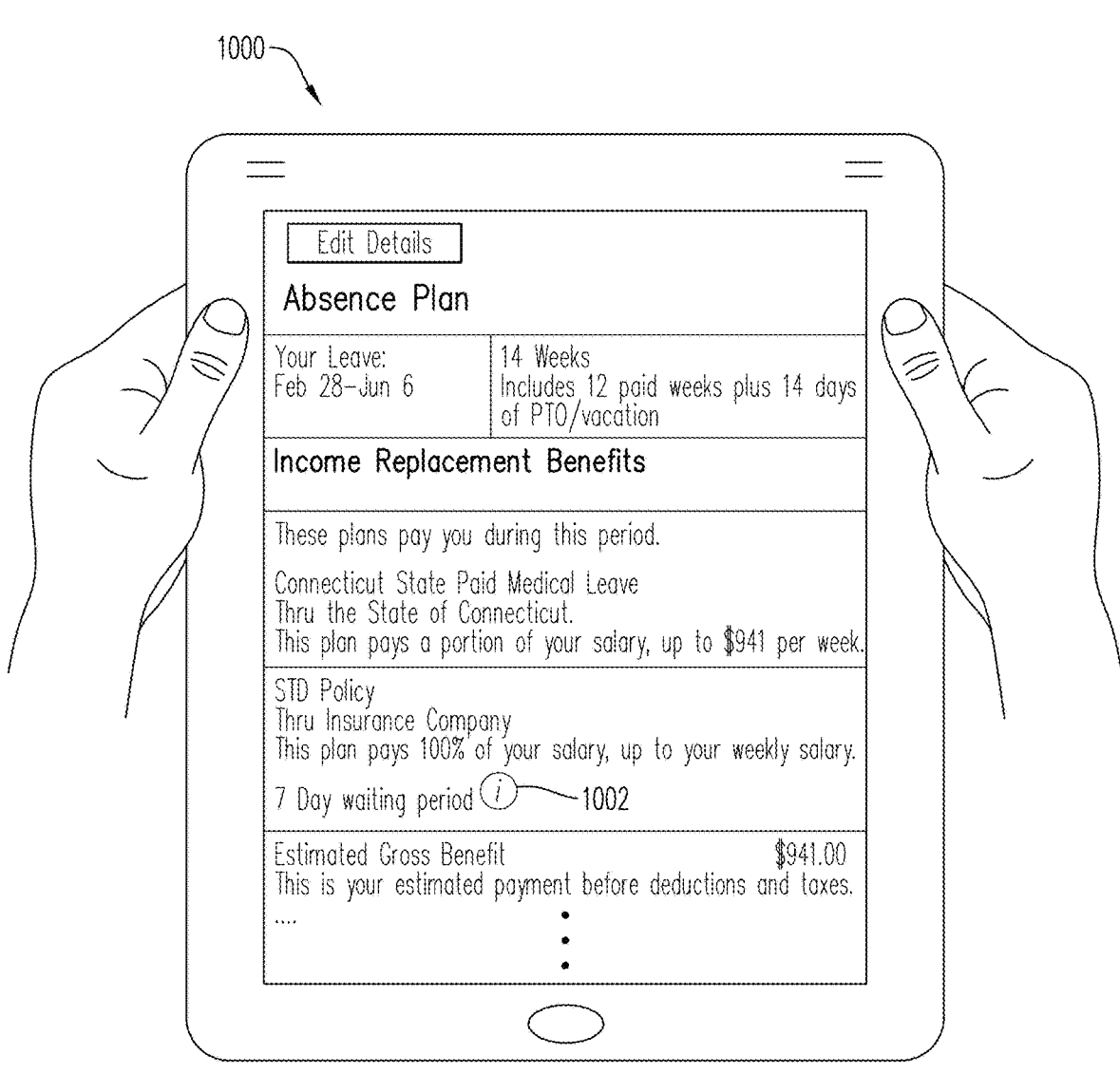
FIG. 10 is another absence plan display according to some embodiments of the present invention.

The absence plan 902 is a summary of the benefits available to the user in the event they take the LOA. The absence plan 902 may include the job protection (FIG. 13), estimated pay, milestone dates (e.g., including a timeline 904), next steps and other suitable information. The display 900 for the absence plan 902 may include links (indicated by the underlined text) 906 or other elements (e.g., information element 1102 of FIG. 11) providing more details when selected. Continuing with the non-exhaustive example shown herein, selection of the "Learn how" link 906 for "You can receive up to $948.40 per week and you'll have job protection," takes the user to an Income Replacement Benefits display 1000 (FIG. 10). It is noted that by only providing the additional details display upon request, reduced bandwidth is used as less data is transmitted as compared to providing the additional details as part of the display in FIG. 9. Pursuant to some embodiments, calculations displayed are gross benefits without taxation or deductions.

Figure 11:
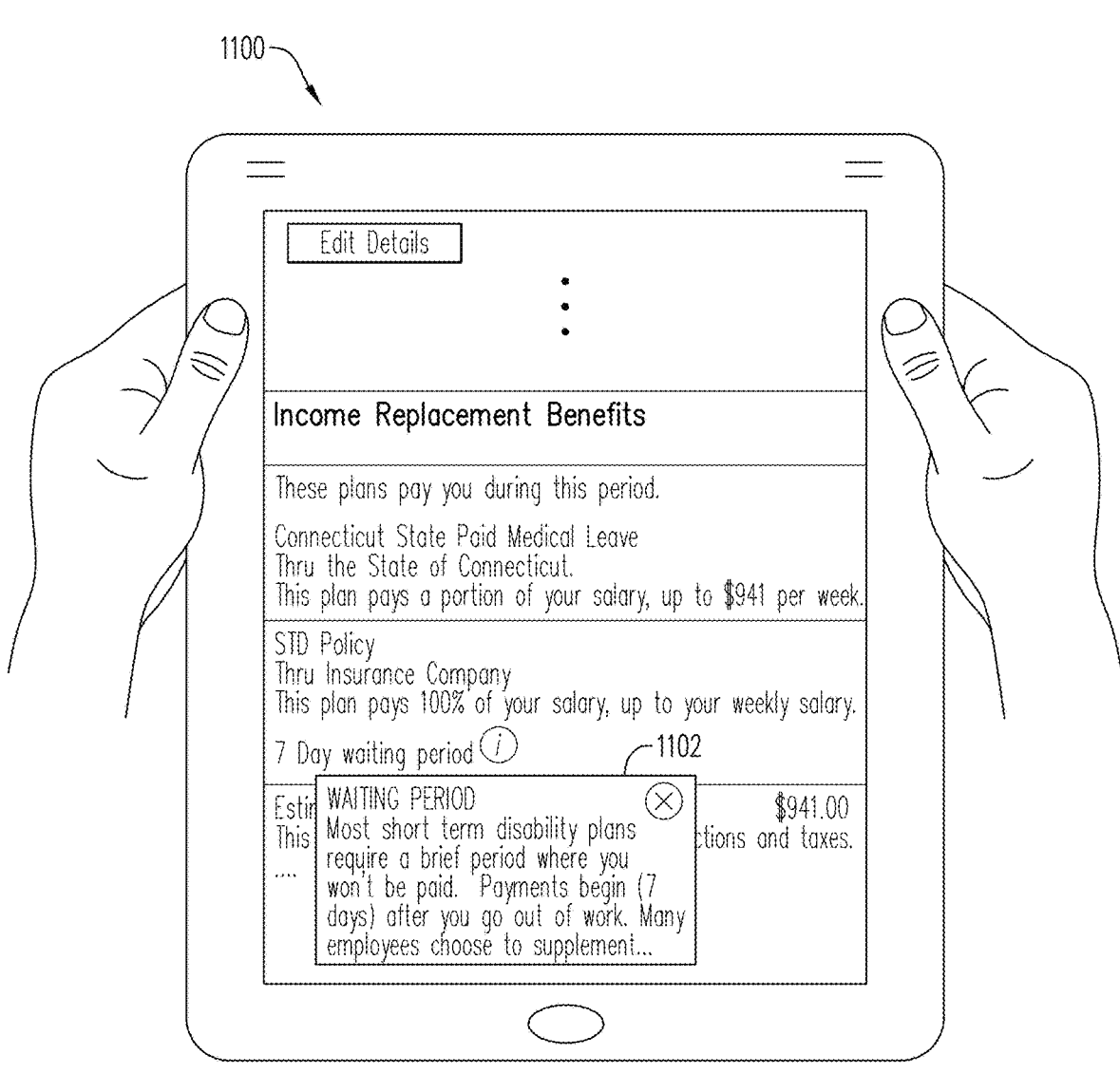
FIG. 11 is the absence planning display of FIG. 10 including a pop-up window according to some embodiments of the present invention.
Figure 12:
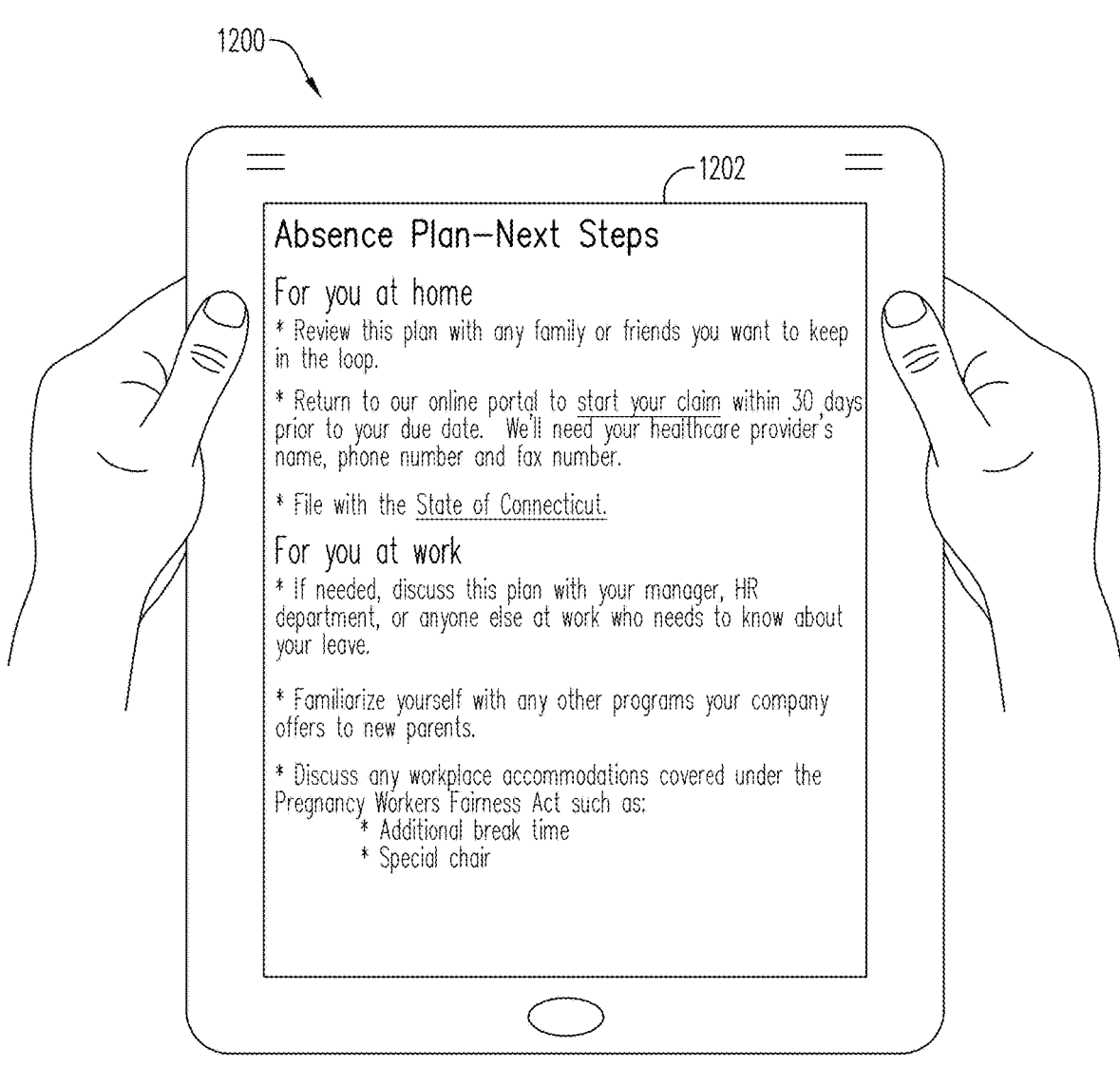
FIG. 12 is a next step display according to some embodiments of the present invention.

The Income Replacement Benefits display 1000 includes an information element 1002. Selection of the information element 1002 may result in a pop-up window 1102, as shown in FIG. 11, including a further description. Here, selection of the information element 1102 provides a definition of the "waiting period." It is noted that while the information element 1002 is only shown in FIG. 10, information elements 1102 may be included throughout the displays (e.g., 400, 500, 600, 700, 800, 900, 1000, etc.).

The next steps of the absence plan 902 may be included in a next step display 1200 and may be a customized to-do list 1202 by leave type. The next steps may be organized by things to do at home and things to do at work. The next steps may include, but are not limited to, reviewing the plan, starting the claim with the insurance company, filing the claim with the state, discussing the plan with the client, etc.

The personalized timeline 904 and checklist of the to-do list 1202 allow the user to stay on track with milestone dates and to-dos that are tailored to the user's specific circumstances. This allows the user to see their employer's plan, understand their leave balances and other "to do" items based on their leave dates, their leave types and their employer's policies.

Figure 13:
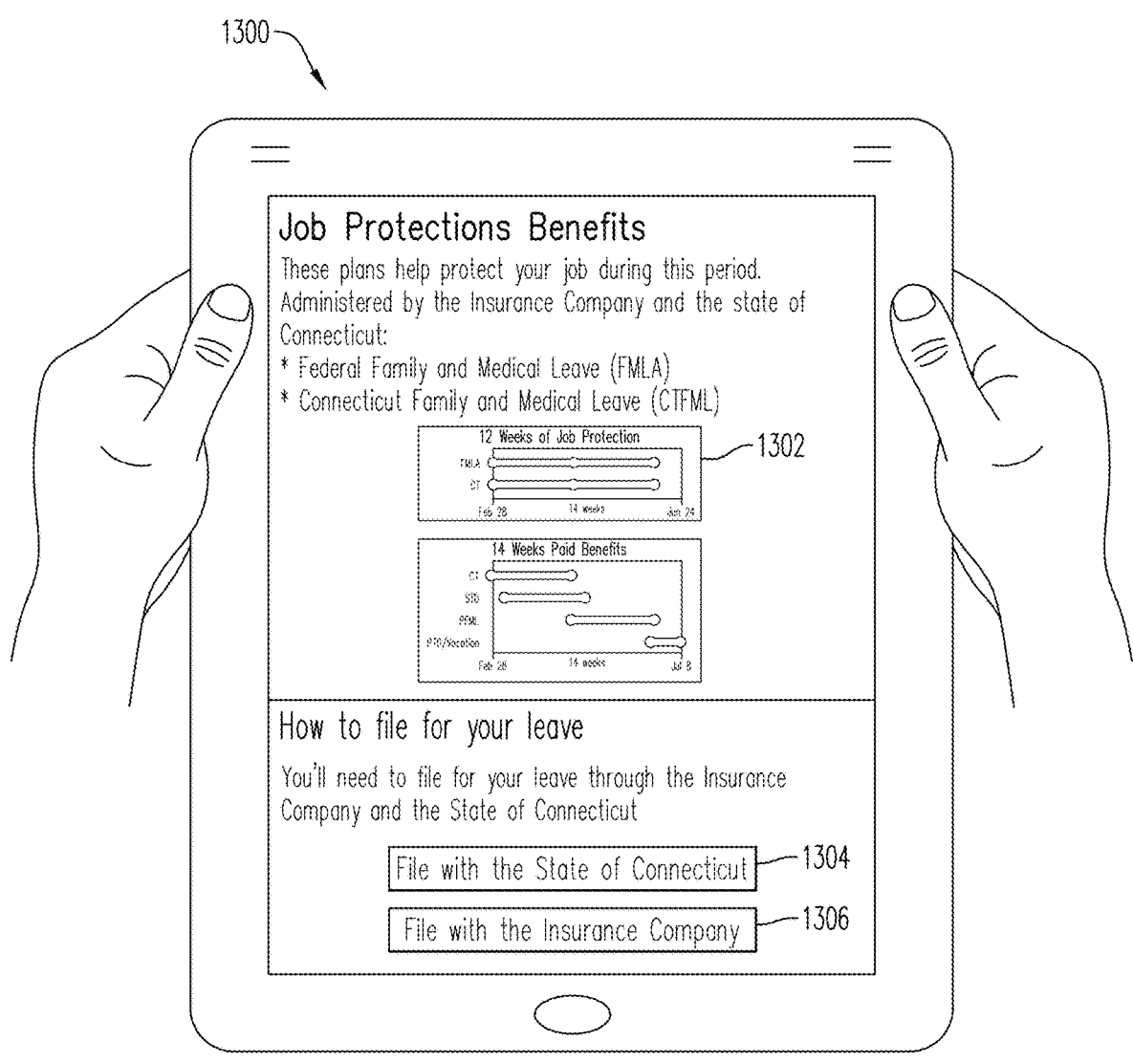
FIG. 13 is an absence planning display according to some embodiments of the present invention.

FIG. 13 is a Job Protection Benefits display 1300, including the different agencies covering the leave. Here, the leave is administered by both the FMLA and the CTFML. The Job Protection Benefits display 1300 may also include one or more graphs 1302 showing the leave.

The Job Protection Benefits display 1300 also includes a selectable "File with the State" element 1304 and a selectable "File with the Insurance Company" element 1306. Creation of the absence plan is not the submission of a claim for reimbursement. To that end, if the user has a state PFML plan with the insurance company, they will be directed to file with insurance company only; if the user has a state plan managed by the state, the employee will be directed to the correct state filing website. The user may also be directed, as shown in FIG. 13, to file with both the insurance company and the state. Additionally, state filing messages (e.g., file with the state of Connecticut) will generate, and links will be provided, even if the client does not have state coverages with the insurance company.

In one or more embodiments, selection of the "File with the State" element 1304 or the "File with the Insurance Company" element 1306 causes the back-end application computer server 150 to execute the claim request engine 190. The claim request engine 190 may retrieve the data used to generate the absence plan 902 and generate the claim request 1406 (FIG. 14) with that retrieved data. The claim request 1406 includes a detailed listing of the user's leave type, the leave start and end date, paid time off balance, salary, a preliminary mapping of terms to the user parameters, and a determination of the benefits to be administered to the user. In one or more embodiments, a review process may be executed prior to submitting the claim to the remote administrator platform 160 for the insurance company or the government platform 170. The claim request engine 190 may search for-via the API service connection to the government platform 180 and/or the remote administrator platform 160—and pull appropriate government and/or insurance company forms, fill out/complete the form and submit the government and/or insurance company generated form to the appropriate party, such as a digitally generated government approved reimbursement submission form, per a process of dynamic form generation. The claim request engine 190 may be configured for performing a double check of the form to ensure it has been appropriately filled out (completed), and where data is deemed to be missing, it may be flagged for review and/or a search of the data performed and inserted. The claim request engine 190 collects the data that was ingested and extracted in the generation of the absence plan, and evaluates the data to be submitted with regard to generating a claim, such as the basic requirements to build a claim. Then, based on that information, the claim request engine 190 creates the claim request 1406. Rules may be applied to the data to ensure the required fields to complete the claim request have been completed. As an example, this process may include running one or more queries to ensure the claims data is complete, such as a query to determine the presence of necessary information, such as a signature. As noted above, as more states implement their own leave plans, complicated—and disparate—state—based calculations are being applied to determine benefits (e.g., in state A the benefit is calculated by taking 80% of three different values plus 50% of two different values plus a percentage of another value, while in state B the benefit is calculated by taking the average of two values plus a percentage of another value and 75% of 5 other values). The use of the API service to connect to the government platform 170 and/or remote administrator platform 160 and ingest this data to seamlessly inform the benefit calculations for the absence plan (which may in turn be used for the claim request) or the claim request directly, provides the benefit of data on-the-fly and with greater accuracy and user-specific detail. If data is missing, real-time correction may be implemented. Pursuant to some embodiments, the API service 140 provides an interface between the back-end application computer server 150 and the government platform 170 and/or the remote administrator platform 160.

Once the forms are complete, the back-end application computer server 150 electronically submits the claim form to the appropriate government platform and/or remote administrator platform (insurance company) via the API service 140 initiating a government process at the government authority and/or a resource process at the insurance company.

It is noted that selection of the "Begin a New Claim" element 302 in FIG. 3 also causes the back-end application computer server 150 to execute the claim request engine 190, as described above.

Figure 14:
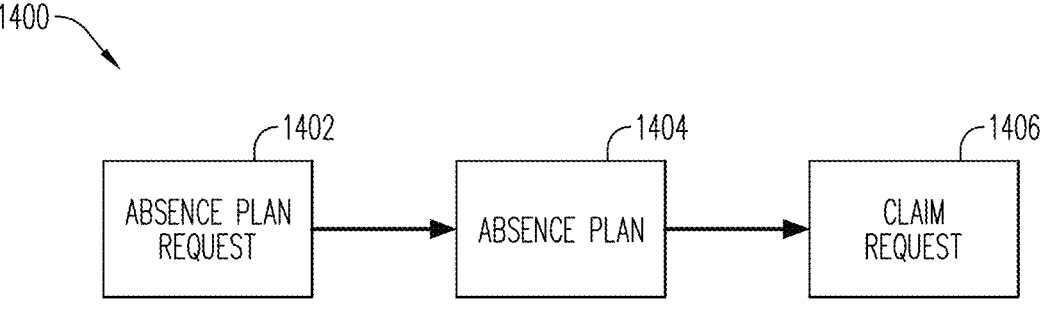
FIG. 14 is a sequence diagram according to some embodiments of the present invention.

FIG. 14 is a block diagram 1400 illustrating the sequence of generating a claim request for submission to at least one of the insurance company and a government platform. As illustrated, an absence plan request 1402 is received. Then the absence plan 1404 is created. The absence plan may be generated per the process 200 described above with respect to FIG. 2. The generated absence plan is used to generate the claim request 1406 as described above.

Figure 15:
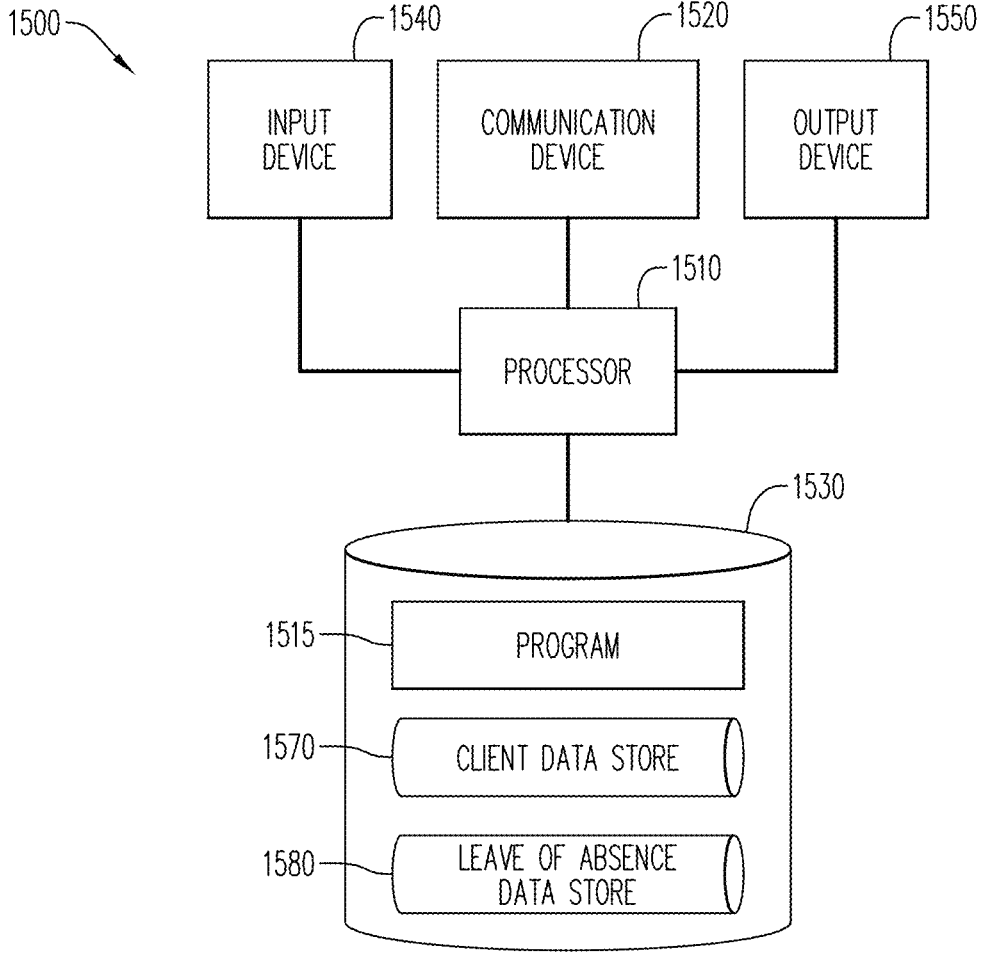
FIG. 15 is a block diagram of an apparatus or platform in accordance with some embodiments of the present invention.

The embodiments described herein may be implemented using any number of different hardware configurations. For example, FIG. 15 illustrates an apparatus 1500 that may be, for example, associated with system 100 described with respect to FIG. 1. The apparatus 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote third-party business or economic platforms, administrator computers, insurance agent, and/or communication devices (e.g., PCs and smartphones). Note that communications exchanged via the communication device 1520 may utilize security features, such as those between a public internet user and an internal network of an insurance company and/or enterprise. The security features might be associated with, for example, web servers, firewalls, and/or PCI infrastructure. The apparatus 1500 further includes an input device 1540 (e.g., a mouse and/or keyboard to enter information about data sources, leave of absence data, third-parties, etc.) and an output device 1550 (e.g., to output leave of absence plans, claim requests, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or an application for controlling the processor 1510. The processor 1510 performs instructions of the program 1515, and thereby operates in accordance with any of the embodiments described herein. For example, the processor 1510 may receive an absence plan request and, based on the system tools, automatically generates the absence plan and outputs the absence plan to the user.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the apparatus 1500 from another device; or (ii) a software application or module within the apparatus 1500 from another software application, module, or any other source.

In some embodiments (such as shown in FIG. 15), the storage device 1530 further includes a client data store 1570 and a leave of absence data store 1580. Databases described herein are only examples, and additional and/or different information may be stored therein. Moreover, various databases might be split or combined in accordance with any of the embodiments described herein. For example, the client data store 1570 and the leave of absence data store 1580 might be combined and/or linked to each other within the program 1515.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of entities, embodiments may instead be associated with other types of businesses in addition to and/or instead of those described herein. Similarly, although certain types of insurance, business operation, and entity parameters were described in connection with some embodiments herein, other types of insurance products and/or entity parameters might be used instead.

Note that the displays and devices illustrated herein are only provided as examples, and embodiments may be associated with any other types of user interfaces. For example, while FIGS. 3-13 illustrate a handheld tablet computer, other display devices may include a desktop computer or other mobile device.

The present invention has been described in terms of several embodiments solely for the purpose of illustration. Persons skilled in the art will recognize from this description that the invention is not limited to the embodiments described but may be practiced with modifications and alterations limited only by the spirit and score of the appended claims.

What is claimed is:

1. An absence planning system implemented via a back-end application computer server, comprising:

(a) a data store that contains electronic records, each electronic record representing a user, and including, for each user, an electronic record identifier and a set of user parameter values;

(b) the back-end application computer server, coupled to the data store, including:

a computer processor; and a computer memory, coupled to the computer processor, storing instructions that, when executed by the computer processor, cause the back-end application computer server to:

receive an absence planning request from a first user;

receive data for the first user from the data store and at least one of a first third-party platform and a second third-party platform;

extract data from the received data for the first user;

apply an absence planning algorithm to the extracted data to dynamically generate an absence plan;

output the generated absence plan, the absence plan including job protection estimated pay, milestone dates, next steps and one or more links to additional information;

automatically retrieve a third-party form from a third-party source;

complete the retrieved third-party form using the generated absence plan; and submit the generated absence plan to one of the first third-party platform and the second third-party platform; and (c) a communication port coupled to the back-end application computer server to facilitate a transmission of data with remote user devices to support interactive user interface displays, including the absence plan, via a distributed communication network.

2. The system of claim 1, wherein the user is associated with the first third-party platform.

3. The system of claim 1, wherein the second third-party platform is a government platform.

4. The system of claim 1, further comprising instructions that, when executed by the computer processor, cause the back-end application computer server to:

complete a second third-party form using data included in the generated absence plan and data included in the absence planning request.

5. The system of claim 4, further comprising instructions that, when executed by the computer processor, cause the back-end application computer server to:

transmit the completed second third-party form to the second third-party platform, initiating a second third-party process.

6. The system of claim 1, further comprising instructions that, when executed by the computer processor, cause the back-end application computer server to:

complete a form using data included in the generated absence plan and data included in the absence planning request; and initiate a resource process in response to submission of the completed form.

7. The system of claim 1, wherein the data received from the first third-party platform is received in response to one of a push operation or a pull operation.

8. The system of claim 1, wherein the extracted data includes a user location and a leave plan.

9. The system of claim 8, further comprising instructions that, when executed by the computer processor, cause the back-end application computer server to:

retrieve second third-party data that is location-specific based on the user location for execution of the absence planning algorithm.

10. The system of claim 9, wherein the location-specific second third-party data includes state-based rules.

11. The system of claim 1, wherein the data received for the first user from the at least one of the first third-party platform and the second third-party platform is received via execution of an Application Programming Interface (API).

12. A computer-implemented method comprising:

receiving an absence planning request from a first user;

receiving, in response to the received absence planning request, data for the first user from a data store and at least one of a first third-party platform and a government platform;

extracting data from the received data for the first user;

dynamically generating an absence plan via application of an absence planning algorithm to the extracted data;

outputting the generated absence plan, the absence plan including job protection estimated pay, milestone dates, next steps and one or more links to additional information;

automatically retrieving a third-party form from a third-party source;

completing the retrieved third-party form using the generated absence plan; and submitting the generated absence plan to one of the first third-party platform and the government platform.

13. The method of claim 12, wherein the user is associated with the first third-party platform.

14. The method of claim 12, further comprising:

completing a government form using data included in the generated absence plan and data included in the absence planning request.

15. The method of claim 14, further comprising:

transmitting the completed government form to the government platform, initiating a government process.

16. The method of claim 12, further comprising:

completing a form using data included in the generated absence plan and data included in the absence planning request; and initiating a resource process in response to submission of the completed form.

17. One or more non-transitory computer-readable media storing program code that, when executed by a computing system, causes the computing system to perform operations comprising:

receiving an absence planning request from a first user;

receiving, in response to the received absence planning request, data for the first user from a data store and at least one of a first third-party platform and a second third-party platform;

extracting data from the received data for the first user;

dynamically generating an absence plan via application of an absence planning algorithm to the extracted data;

outputting the generated absence plan, the absence plan including job protection estimated pay, milestone dates, next steps and one or more links to additional information;

automatically retrieving a third-party form from a third-party source;

completing the retrieved third-party form using the generated absence plan; and submitting the generated absence plan to one of the first third-party platform and the second third-party platform.

18. The media of claim 17, wherein the second third-party platform is a government platform.

19. The media of claim 17, further comprising:

completing a second third-party form using data included in the generated absence plan and data included in the absence planning request.

20. The media of claim 19, further comprising:

transmitting the completed second third-party form to the second third-party platform, initiating a second third-party process.

\*  \*  \*  \*  \*